(12) United States Patent
R (10) Patent No.: US 10,936,475 B2
(45) Date of Patent: Mar. 2, 2021

(54) AUTOMATED SCRIPTING AND TESTING SYSTEM

(71) Applicant: SAP SE, Walldorf (DE)

(72) Inventor: Jai Vignesh R, Chennai (IN)

(73) Assignee: SAP SE, Walldorf (DE)

( * ) Notice: Subject to any disclaimer, the term of this patent is extended or adjusted under 35 U.S.C. 154(b) by 158 days.

(21) Appl. No.: 16/180,717

(22) Filed: Nov. 5, 2018

(65) Prior Publication Data

US 2020/0142816 A1 May 7, 2020

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC ............... G06F 11/3684; G06F 11/3688
See application file for complete search history.

(56) References Cited

U.S. PATENT DOCUMENTS

| | | | |
|---|---|---|---|
| 8,001,468 B2 | 8/2011 | Khaladkar et al. | |
| 8,448,138 B2 | 5/2013 | Chang et al. | |
| 8,924,798 B2 * | 12/2014 | Jerde | G06F 11/30 714/26 |
| 9,268,674 B1 * | 2/2016 | Ben-Cnaan | G06F 11/3688 |
| 9,342,237 B2 | 5/2016 | Zeng et al. | |
| 9,734,042 B1 * | 8/2017 | Elgarat | G06F 11/3672 |
| 10,394,700 B1 * | 8/2019 | Unsal | G06F 11/3676 |
| 2003/0188298 A1 * | 10/2003 | Shaposhnick | G06F 11/3676 717/141 |
| 2006/0075306 A1 * | 4/2006 | Chandrasekaran | G06F 11/3688 714/47.2 |
| 2006/0253742 A1 | 11/2006 | Elenburg et al. | |
| 2008/0162688 A1 * | 7/2008 | Reumann | G06Q 10/10 709/224 |
| 2009/0077422 A1 * | 3/2009 | Khaladkar | G06F 11/3684 714/33 |
| 2011/0214107 A1 * | 9/2011 | Barmeir | G06F 11/3684 717/125 |
| 2013/0346950 A1 * | 12/2013 | Horovitz | G06F 11/3692 717/128 |
| 2014/0040667 A1 * | 2/2014 | Zemer | G06F 11/3684 714/32 |
| 2014/0095934 A1 * | 4/2014 | Dancy | G06F 11/3684 714/32 |
| 2016/0162398 A1 | 6/2016 | Shabazz et al. | |
| 2017/0329687 A1 | 11/2017 | Chorley et al. | |

(Continued)

*Primary Examiner* — Yolanda L Wilson
(74) *Attorney, Agent, or Firm* — Sterne, Kessler, Goldstein & Fox P.L.L.C.

(57) ABSTRACT

Disclosed herein are system, method, and computer program product embodiments for providing an automated scripting and testing system. An embodiment operates by receiving an interaction between a user and an application. It is determined that the received interaction corresponds to at least one stored interaction based on a comparison of the received interaction with one or more of a plurality of stored interactions. A count of stored corresponding interactions is incremented. It is determined that the count exceeds a threshold. A scripted interaction with the application is generated based on the received interaction and the at least one stored interaction. The scripted interaction is provided for testing the application.

17 Claims, 9 Drawing Sheets

(56) References Cited

U.S. PATENT DOCUMENTS

2017/0337116 A1* 11/2017 Negara ............... G06F 11/3664
2017/0364433 A1* 12/2017 Kaulgud ............. G06F 11/3612
2018/0173614 A1* 6/2018 Gong .................... G06F 3/0304

* cited by examiner

```
▼ <div class="cropped-image-link image-map shogun-widget card lite" id="dzsflaw5gf9wm1x1ij6klem">
  ▼ <div class="cropped-image-map-size" style="height: 300px">
    ▼ <div class="cropped-image-map-center-alignment">
      ▼ <span style="display: inline-block">
        ▼ <a class="a-link-normal aok-inline-block" href="/dp/B0725W7O38/ref=gw_pc_echo_default_family_Feb20th?pf_rd_p=d0b74446-
           b307=4ee8=89e0=9e636817b95&pf_rd_r=FZ99573Z950BR6WJFOD2">
            <img alt="Amazon Device Echo" src="https://images-eu.ssl-images-amazon.com/images/G/31/img17/AmazonDev._isvdut ⎫
            2018-01-08T11-34_966b1b_echo_alexa_superhero_2_1x._CB488251339_.jpg" height="300px" width="1500px" data-a-         ⎬ 304
            hires=https://images-eu.ssl-images-amazon.com/images/G/31/img17/AmazonDevices/Neel/January18/GW/daisydut_2018-01- ⎭
            09T11-51_22aab6_echo_alexa_superhero_2__CB488251333_.jpg"> == $0
          </a>
        <div class="a-section"></div>
      </span>
      </div>
    </div>
   </div>
   <li class="a-carousel-card" role="listitem" aria-setsize="7" aria-posinset="5" aria-hidden="true" style="visibility: visible; width: 1500px; margin:
   0px;">...</li>
```

AUTOMATED SCRIPTING AND TESTING SYSTEM

BACKGROUND

Generally, when changes are made to a software application, the changes need to be tested to ensure the application continues to operate as intended. Application testing often requires a human tester to manually design a test script for testing a new or modified feature of an application. This manual test script design may require the tester to guess how an end user may use the application, and particularly how the new/modified feature may be used. However, the way a tester accesses or interacts with the application is often different from how actual end-users interact with the application, and so the feature may not be fully tested. Further, computing resources and time must be allocated to allow testers to manually design test scripts for the application.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing automated scripting and testing.

Figure 1:
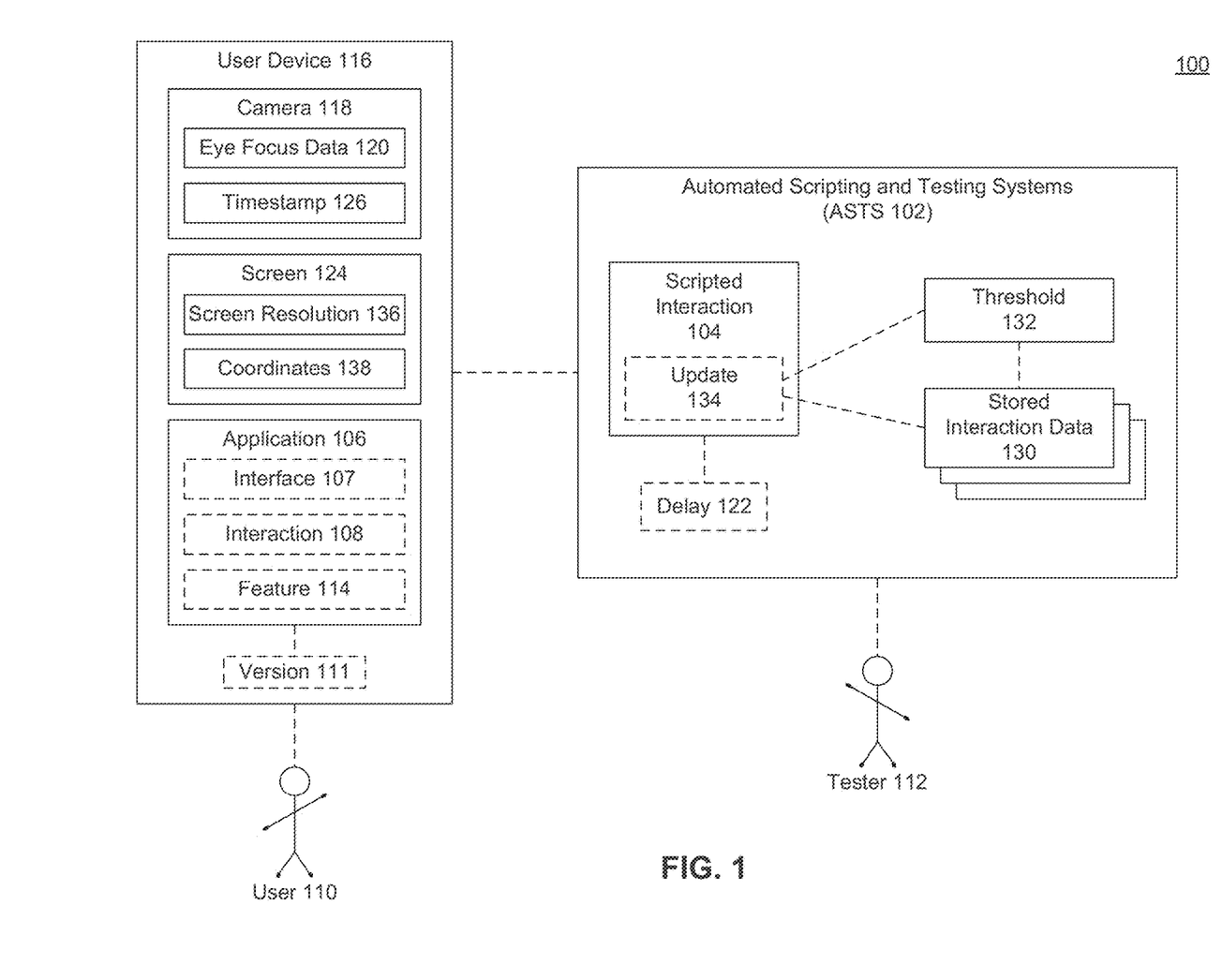
FIG. 1 is a block diagram illustrating example functionality for providing an automated scripting and testing system, according to some embodiments.

FIG. 1 is a block diagram 100 illustrating example functionality for providing an automated scripting and testing system, according to some embodiments. An automated scripting and testing system (ASTS) 102 may generate test scripts (e.g., scripted interactions 104) for testing an application 106.

In some embodiments, ASTS 102 is able to generate scripted interactions 104 without requiring the specific allocation of additional computing resources for extended periods of time to a human tester 112 whose job function it is to manually design a test script for changes to application 106. For example, ASTS 102 may generate its own scripted interactions 104 for testing application 106 through leveraging the already allocated resources being consumed by end-users 110 in operating the application 106. In an embodiment, ASTS 102 may monitor and/or record how live end users 110 are interacting 108 with application 106, specifically any changed, removed, added, or otherwise modified features 114.

ASTS 102 may determine how application 106 is being used by end users 110 on one more end user computing devices 116. As is discussed in greater detail below, user device 116 may include software that enables ASTS 102 to monitor user 110 (using a camera 118) during the usage, execution, or operation of application 106. In an embodiment, application 106 may include either a web application or locally stored application or program.

End users 110 may be actual customers to whom application 106 has been released or otherwise made accessible. End users 110 may include an alpha group of users, a beta group of users, or segments of user populations to whom a particular version 111 of application 106 is provided. In an embodiment, different versions 111 of application 106 may include different modifications to one or more features 114 to be tested. The group of end users 110 however may not include a tester 112 or employee to whom additional computing or system resources must be allocated, or whose job function or role it is to design a test script for application 106.

While a tester 112 may be able to test several aspects of a new feature, the tester-developed test scenario may not mimic how an actual end-user 110 is going to be interacting with application 106. As such, using testers 112 to design test scripts and test applications 106 may not capture bugs or glitches in the changes to the application as they would be experienced by an actual end-user 110. By monitoring users 110 during actual use of application 106 (including feature 114), ASTS 102 may develop more accurate scripted interactions 104 than would otherwise be possible by a tester 112 trying to guess how users may interact with application 106.

Further, ASTS 102 may save or preserve both the time and computing resources that would otherwise need to be allocated to a team of human testers 112, by monitoring the usage of end users 110. As such, ASTS 102 may preserve the computing resources (e.g., computing cycles, memory, devices, etc.) that would otherwise be dedicated to testers 112 as they are working through the various features of application 106 and manually developing possible test scripts. Waiting for testers 112 to develop test scripts prior to releasing a particular version 111 of an application 106 would also add additional time to the software development lifecycle, which may delay releases.

In an embodiment, application 106 may be an active application (being used by consumers or end users 110) that may have one or more builds or versions 111 that are released to various subsets of the users 110. For example, a particular subset of users 110 may have access to a first version 111 of application 106, while a second subset of users 110 may have access to a second version of 111 of application 106. The versions 111 may differ by any number of features 114.

The various builds or versions 111 of application 106 may each include at least one different feature 114 that has been added, removed, or otherwise modified. The feature 114 may change a visual appearance or interface 107 of application 106, or may change how the application operates (on the backend, which may not be visible to users 110) when a particular function 114 is executed or activated. Example features 114 include adding or removing code, changing a visual interface by adding, removing, or editing elements, changing a development environment, migrating services to different computing devices, changing how certain existing functionality performs, adding new functionality, removing existing functionality, and modifying how existing functionality operates, to name just some examples.

In an embodiment, when a developer or group of developers add a feature 114 (which may include removing or modifying previously existing functionality, for example), the developers often find it beneficial to have the feature 114 tested to ensure it is operating as expected. Rather than requiring a paid tester 112 or employee to try and use the application 106 to test the feature 114, in some arbitrary manner that is designed to mimic an end user's interactions with application 106, ASTS 102 may monitor, record, or receive actual interaction data 108 from one or more users 110 to whom a particular version 111 of application 106 including a modified feature 114 was released.

By releasing a version 111 of application 106 to a set of end users 110, and monitoring their interactions 108 with the modified features 114, ASTS 102 shortens the application development lifecycle. For example, ASTS 102 may simultaneously monitor or record interactions 108 from hundreds or thousands of users 110 who are using application, and generate scripted interaction 104 in a fraction of the time as would be necessary for a group of one or more testers 112 to manually step through and design their own test scripts for application 106.

Further, scripted interaction 104 may be far more accurate than a manually designed test script because it is based on actual user interactions 108. ASTS 102 enables a system to save and reallocate the computing resources that would otherwise be allocated to one or more testers 112 to test application 106, to other operations of a system, such as further application development.

In an embodiment, ASTS 102 may simultaneously monitor user interactions 108 with multiple versions 111 of application 106, thereby developing different scripted interactions 104 for each version 111. In an embodiment, a version 111 may correspond to a particular release on a particular operating system of device 116. For example, two different versions 111 may exist for application 106 that include a similar feature 124 but each of which are operable on different underlying operating systems of device 116.

Interaction 108 may include any user action (e.g., keyboard input, screen touch, mouse movement, voice command, etc.) with application 106. In an embodiment, interactions 108 may include attempted interactions, such as a user who tries to select a button on an interface 107 of application 106.

In an embodiment, application 106 may be an app or other program operating on a user device 116. Computing device 116 may include any device including one or more processors and a memory, including but not limited to, a mobile device, smart television, laptop, desktop, tablet, watch, or other device. Computing device 116 may include or communicate with a screen 124 upon which interface 107 is displayed.

In an embodiment, user device 116 may include a camera 118. Camera 118 may include a digital camera, which may be a video recorder. In an embodiment, camera 118 may be arranged or configured such that it is able to track the eye and/or head movements of user 110 as the user 110 is interacting with application 106, particularly when interacting with feature 114. In another embodiment, another device other than user device 116, such as a different camera, may be used to track a user's head and/or eye movements as she is interacting with application 106. This tracking of a user's eye/head movement as she is interacting with application 106, and particularly while interacting with feature 114 of version 111, may be received or stored as eye focus data 120.

Based on eye focus data 120, ASTS 102 may be able to determine on which part of a screen or interface a user's 110 attention is focused. In an embodiment, eye focus data 120 may include a timestamp 126 indicating when the eye focus data was captured. ASTS 102 may cross-reference the timestamp 124 of eye focus data 120 with corresponding timestamps regarding the functionality of application 106. Based on this timestamp comparison, ASTS 102 may identify underlying document object model (DOM) elements or visual elements of interface 107 which may have been activated or selected at the same time eye focus data 120 was captured. In an embodiment, the timestamp comparison may include timestamp sequencing, and the timestamps may be used to identify the sequence of the scripted interactions.

For example, when a user selects a button on an interface 107, ASTS 102 may receive eye focus data 120 for where the user's attention was focused before, during, and after the selection, as well as data regarding the attributes of the selected element, and underlying functionality of application 106. Eye focus data 120 may provide valuable information regarding how application 106 is performing for a particular end user 110.

For example, eye focus data 120 may be used to determine whether the user is experiencing or has experienced a delay after the selection of a particular function or feature 114 on interface 107 of application 106. For example, upon selecting an element on the left side of an application interface 107, if eye focus data 120 indicates that the user's eye focus 120 has left the screen 124 or wandered to a different part of the interface 107 for an extended period of time, this may indicate a delay 122 has occurred in application 106.

This delay 122 must be accounted for in generating scripted interaction 104, particularly if it occurs across multiple different users 110. For example, as described in greater detail below, ASTS 102 may automate scripted interaction 104 using automation tools, which may account for delay 122 in the automation. In an embodiment, scripted interaction 104 may include indictors as to which components or elements of interface 107 were selected by users 110, how application 106 processed or responded to the selections, and the timings between the various selections or interactions 108.

As such, if a delay 122 has occurred during the use cases of multiple different users 110, this information may be included in scripted interaction 104. In an embodiment, a tester 112 in a closed test environment, may not experience or be able to detect such a delay 122. In an embodiment, if a delay 122 is detected for only a single user, ASTS 102 may disregard it or flag it as an aberration. However, if ASTS 102 determines that multiple users 110 (beyond a threshold 132) are exhibiting similar behavior with regard to changing eye focus data 120 after the selection or interaction 108 with a particular component of interface 107, then this may be a possible bug, or delay 122 that must be accounted for in scripted interaction 104.

In an embodiment, ASTS 102 may receive and store data received from multiple different users 110 or computing devices 116, as stored interaction data 130. Once an interaction 108 occurs beyond a threshold 132 number of times, the interaction may be implemented as an update 134 to scripted interaction 104. In an embodiment, ASTS 102 may maintain a count of how many times a particular interaction 108 occurs or is detected by users 110. When the count exceeds threshold 132, the interaction 108 may be included as an update 134 to an existing scripted interaction 104, or may be used to develop a new scripted interaction 104.

In an embodiment, whether or not a new scripted interaction is created may depend upon a comparison of existing stored interaction data 130 to any new interactions or updates 134. If there is more than a specified similarity between the interactions (e.g., such as 90% similarity), an existing scripted interaction 104 may be updated 104. Otherwise, a new scripted interaction 104 may be generated.

As noted above, user device 116 may include a screen 124. Screen 124 may be of a particular size or resolution 136. In some embodiments, resolution 136 may indicate a width times height measure of screen 124 in pixels, a type of display (e.g., cathode ray tube, flat-panel, liquid crystal, fixed-pixel, plasma, projection, etc.), and/or a manufacturer or model of display.

In an embodiment, ASTS 102 may normalize interactions 108 that occur across different user devices 106 with different screen resolutions 136. For example, ASTS 102 may capture or receive the coordinates that correspond to interactions 108 with interface 107 on screen 124. Using the coordinate information, ASTS 102 may normalize the interactions 108 across different screen resolutions 136 and use this combined information to group into corresponding stored interaction data 130 to develop scripted interactions 104.

Figure 2:
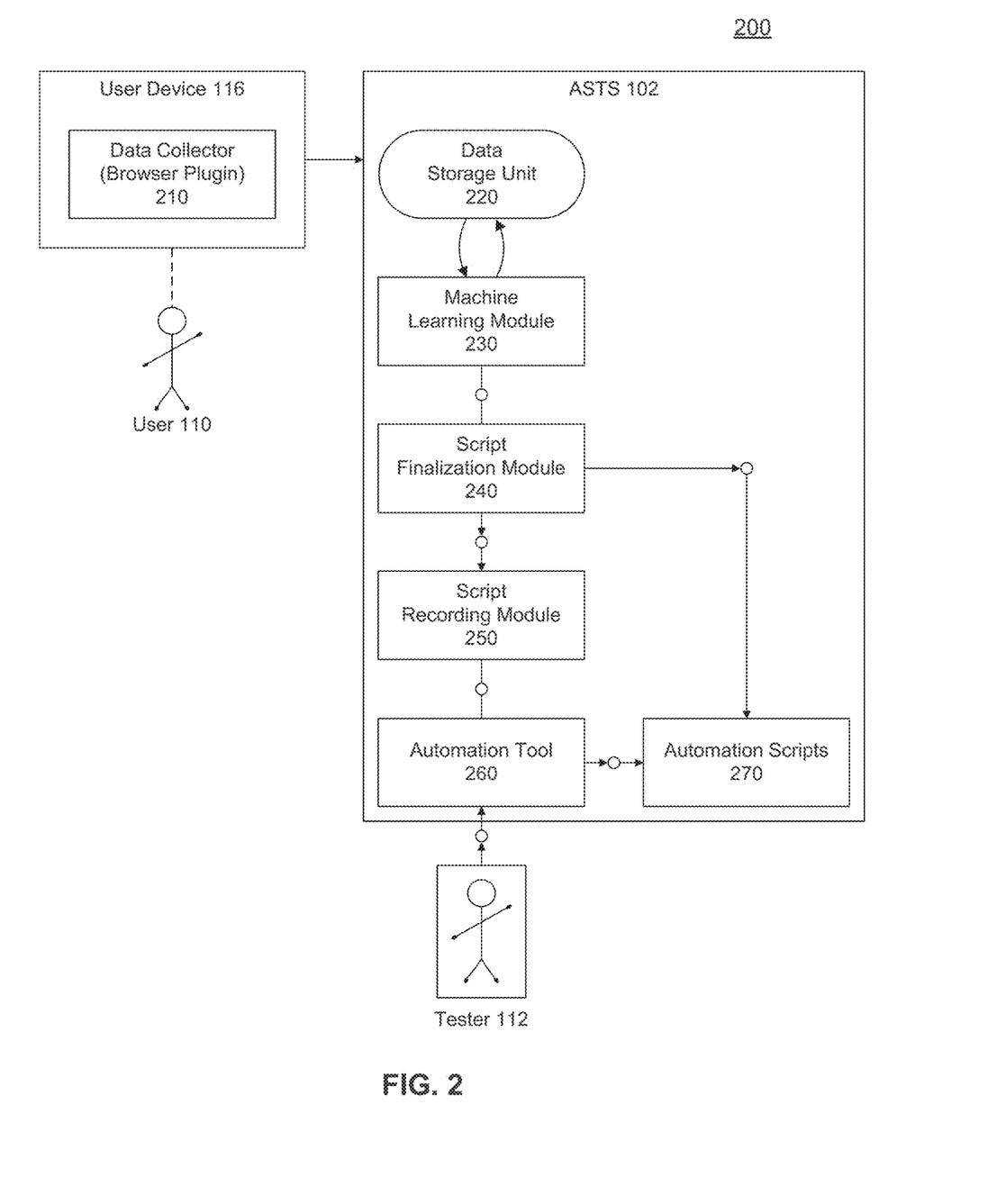
FIG. 2 is a block diagram illustrating example functionality for providing an automated scripting and testing system, according to some embodiments.

FIG. 2 is a block diagram 200 illustrating example functionality for providing an automated scripting and testing system (ASTS) 102, according to some embodiments.

In an embodiment, a data collector 210 may be used to collect interaction data 108 (and eye focus data 120) between users 110 and application 106. Data collector 210 may be downloaded and installed onto user device 116. User 110 may authorize data collector 210 to monitor user interactions 108 with application 106 and camera 118. In an embodiment, data collector 210 may be provided as a feature or add-on feature to application 106.

In an embodiment, user 110 may be operating several different applications on user device 116. Data collector unit 210 may be configured to only collect data from application 106, such that interactions with other applications, or with user device 116 when application 106 is inactive or minimized, are not recorded or monitored by data collector 210.

In an embodiment, data collector 210 may be able to detect when user 110 launches application 106 or activates feature 114. Data collector 210 may begin recording or monitoring interactions 108 with application 106 when application 106 is launched or executed on user device 116.

In an embodiment, data collector 210 may be a browser plugin. For example, a user 110 may be using a web or other network browser to access application 106, which may be a web, cloud, or other network-based application. User 110 may opt-in and download and install data collector 210 into the browser that is operating on user device 116 and is being used to access or execute application 106.

While application 106 is in use, data collector unit 210 may identify and record various values or attributes of display elements selected by user 110, which may include DOM attributes of the display element or user interface objects. For example, data collector 210 may track, monitor, and record which button was selected from interface 107, a timestamp corresponding to the selection, a location of the selected button on interface 107, any arguments passed to or from the selected button, and/or the results of the selected interaction 1108 with the button.

In an embodiment, data collector 210 may have access to camera 118, such as a webcam of user device 116. Data collector 210 may activate, turn on, or otherwise operate webcam 118 which may be arranged to track the head and/or eye ball movement of the user 110 while interacting with application 108 (or while application 108 is active on user device 116). In an embodiment, data collector 210 may timestamp 126 eye focus data 120 and interaction data 108 so that they may be compared and synchronized.

For example, ASTS 102 may synchronize or coordinate (using timestamps 126) eye focus data 120 and interaction data 108 such that a user's eyes may be tracked when they select a button from interface 107.

In an embodiment, by using eye ball movement tracking techniques, data collector 210 may determine whether an area where a user's eye focus is directed to on an interface 107 corresponds to a button or interface selection. If the eye focus data 120 indicates that the user's attention is on a different part of the interface 107 or beyond the screen 124, this may indicate a glitch or processing delay to be accounted for or flagged in scripted interaction 104 (particularly if it occurs beyond a threshold 132 count number of users 110).

In an embodiment, data collector unit 210 may send the interaction 108 and/or eye focus 120 data to a data storage unit 220. These data transmissions may occur at regular time intervals, or upon the happening of a particular event (e.g., selection of a particular button of interface 107, activating a particular function of application 106 (e.g., save), or upon closing application 106).

Data storage unit 220 may receive, store or maintain test data (e.g., interaction data 108, and eye focus data 120 with corresponding timestamps 126) from different users 110. In an embodiment, data storage unit 220 may be a device operating as part of a network storage system (such as a cloud system). In an embodiment, the data may be separated and stored based on the type of device 116, operating system, and/or version 111 about which the data is received.

In an embodiment, data storage unit 220 may normalize data received from different types of devices 116 that are executing a similar version 111 of application 106. Example devices may include laptops, mobile phones, wearables, appliances, internet of things devices, and tablet computers which may be operating a similar browser type or operating system. Data storage unit 220 may normalize the data received from the various screen sizes, types, or resolutions 136.

A machine learning module 230 may include an artificial-intelligence based process that is trained to understand the clicking pattern or interactions 108 of a user 10 by utilizing the data stored in data storage unit 220. In an embodiment, machine learning module 230 may create a scripted interaction 104 (or update 134) as output.

In an embodiment, after a threshold 132 number of iterations of the same interaction 108 by user(s) 110 has been reached, machine learning module 230 may generate or update 134 scripted interaction 104. After an update 134 has been generated (e.g., including generating a new scripted interaction 104), the scripted interaction 104 may be sent to a script finalization module 240.

A script finalization module 240 may compare the scripted interaction 104 generated from the machine learning module 230 with the other previously stored interaction data 130 or scripts, and identify similarities or patterns between the generated and existing scripts. Based on the identified similarities (such as button selections, wait times, user responses, etc.), script finalization module 240 may determine whether to add the new script, or modify (update 134) or replace the existing script to avoid automating the redundant test case flows. In an embodiment, script finalization module 240 and machine learning module 230 may operate together in generating scripted interactions 104 and updates 134.

A script recording module 250 may perform or execute scripted interaction 104 using an automation tool 260. For example, script recording module 250 may simulate a user interaction 108 through an executing version 111 of application 106. An automation tool may include software or a program that controls the execution of tests, and compares actual outcomes with predicted outcomes. In an embodiment, an automation tool may enable ASTS 102 to record a simulated user interaction with application 106 based on scripted interaction 104 to produce an automation script 270. In an embodiment, a tester 112 may use automation tool 260 to observe or modify the scripted interaction 104 or automation script 270. In an embodiment, ASTS 102 may interface with or use different automation tools for executing scripted interaction 104. ASTS 102 may execute and generate the automation script 270 in a format compatible with one or more different automation tools 260 which may be used with ASTS 102.

Figure 3A:
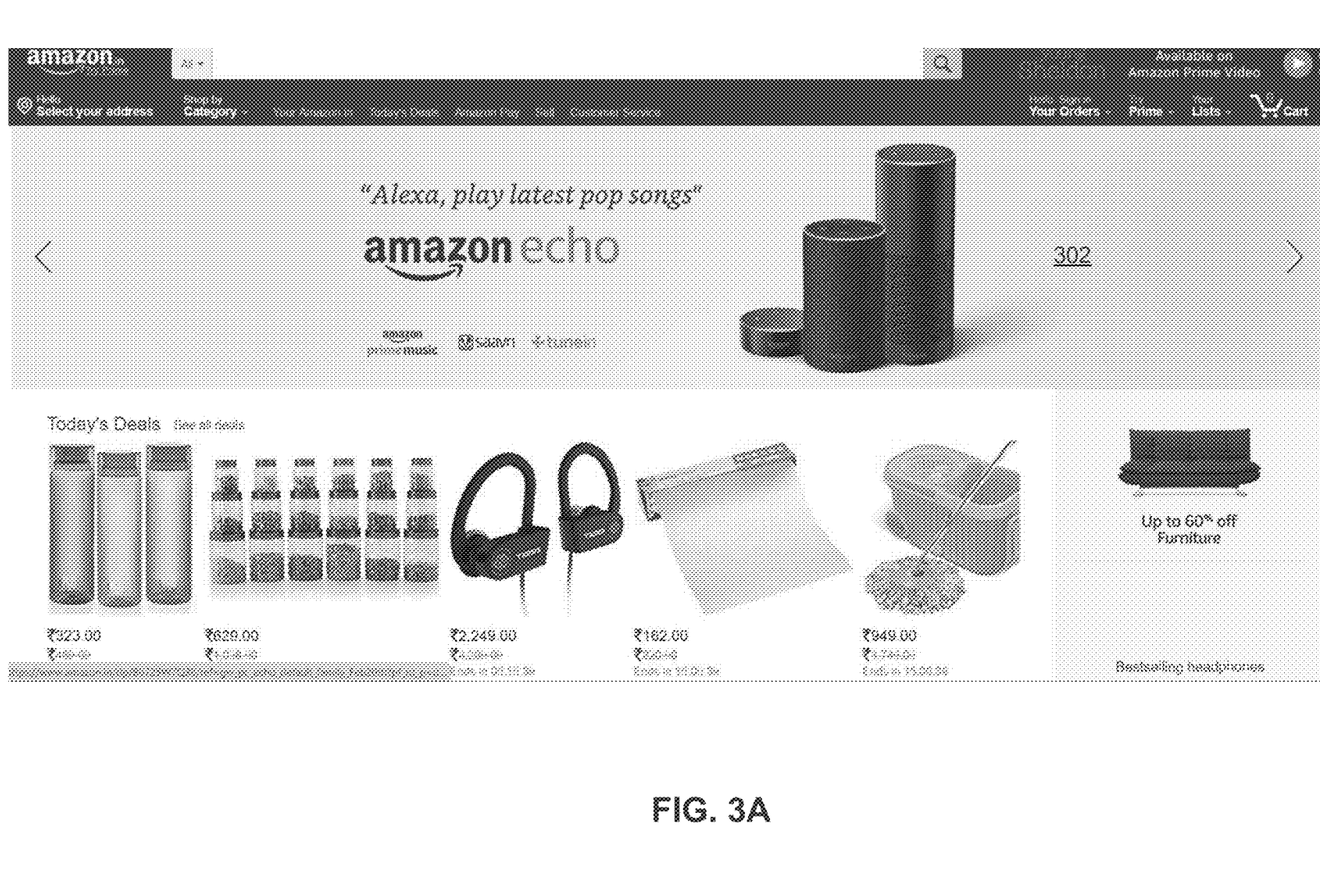
FIGS. 3A-3E illustrate example operations related to providing an automated scripting and testing system with regard to a web application, according to some embodiments.

FIGS. 3A-3E illustrate example operations related to providing an automated scripting and testing system with regard to a web application, according to some embodiments. FIG. 3A illustrates an example interface 107 of an application 106 with which a user 110 may be interacting. The example illustrates a webpage of a commerce site. In the example shown, a data collector 210 (which may be implemented within a browser being used to view the webpage) may detect an interaction 108 (e.g., mouse click or selection) of the main image 302 on the webpage.

Figure 3B:
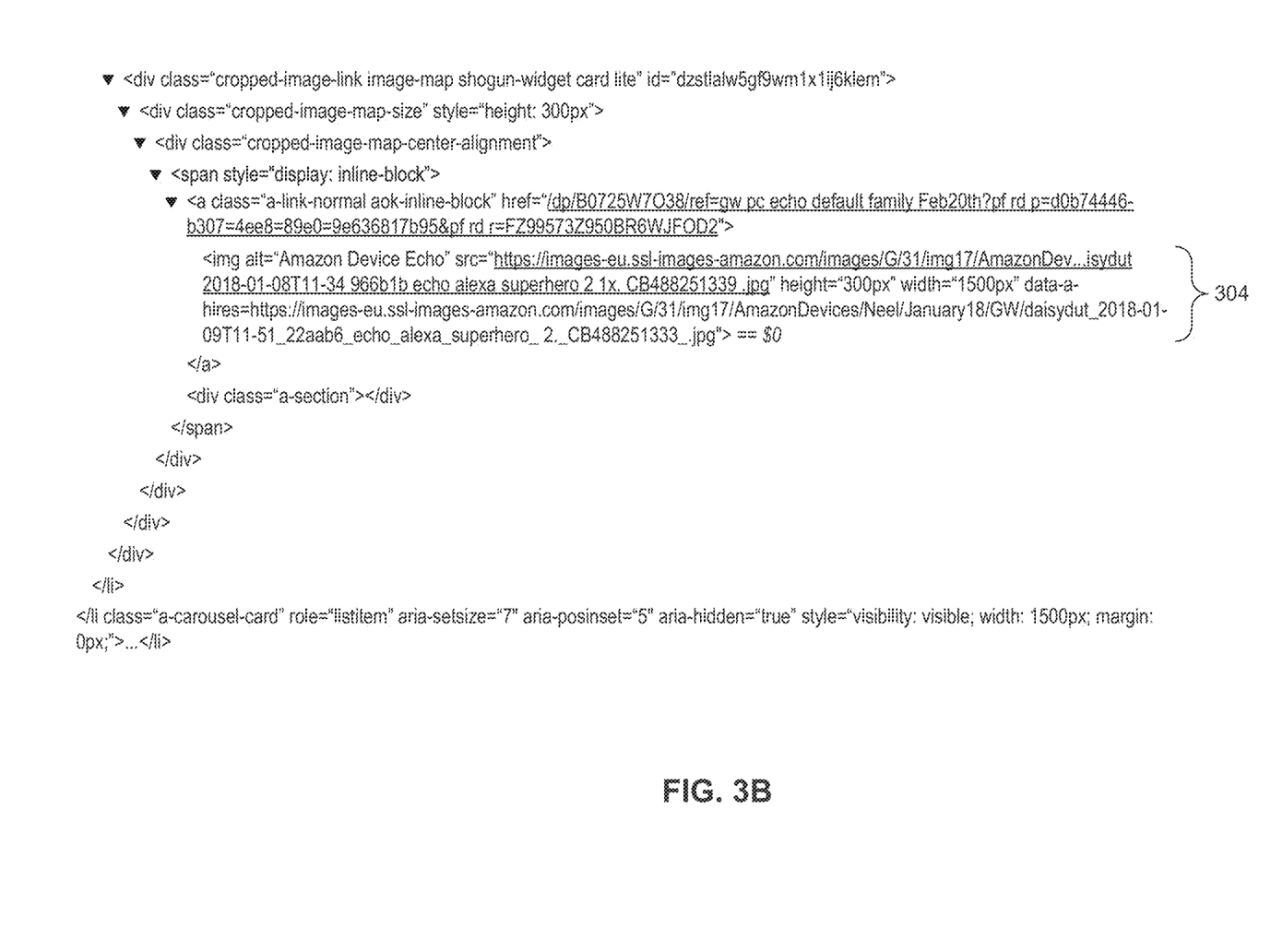

In an embodiment, as illustrated in FIG. 3B, data collector 210 may read and store the attributes 304 of the selected image 302. In the illustrated example, the attributes 304 may be determined, retrieved, or read from the executed HTML (hyper-text markup language) as executed by the browser. The collected attribute data (which may be stored as interaction data 108) may include the variables, values, and other parameters from the DOM (document object model) of the webpage. This may be stored together with a timestamp 126 of when the image 302 was selected.

Figure 3C:
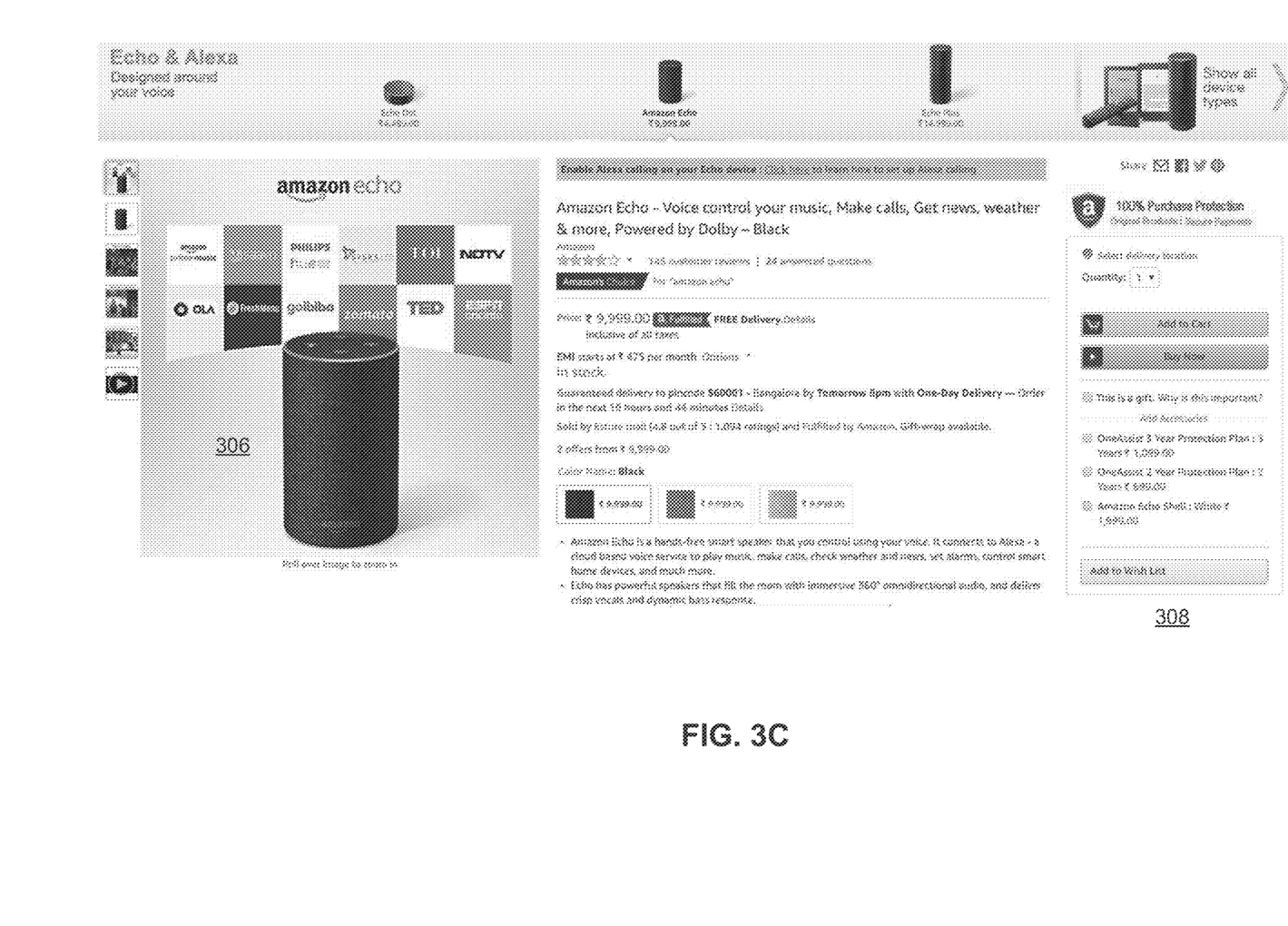
Figure 3D:
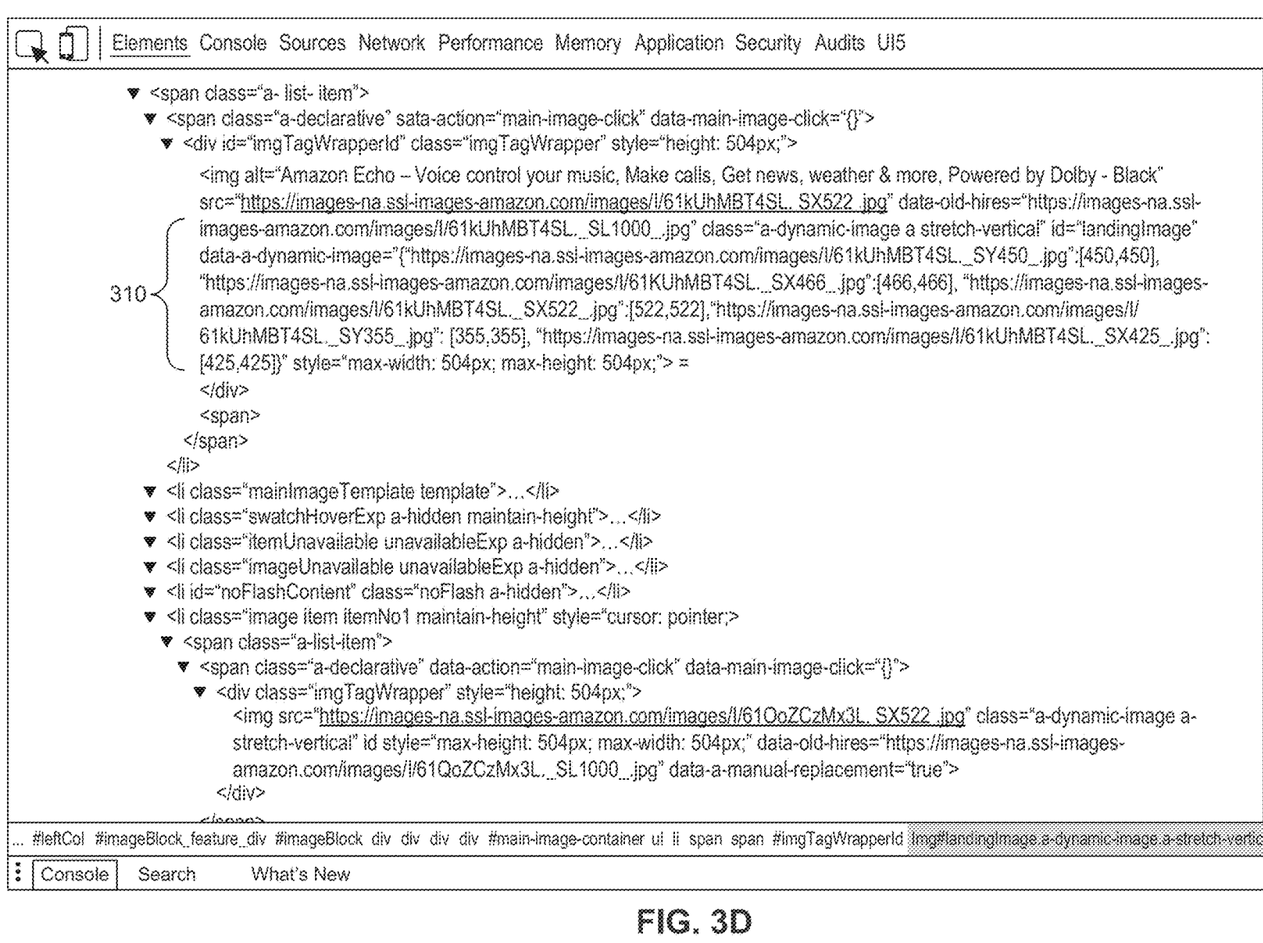

The selection of the image 302, may cause the browser to load a second interface page 107 of the website (e.g., application 106) as illustrated in FIG. 3C. Data collector 210 may then collect the new image data for the screen of FIG. 3C, as illustrated by data 310 of FIG. 3D. In an embodiment, data collector 210 may be configured to focus on or collect image data from the various interfaces 107, which may correspond to the new features 114.

In an embodiment, a camera 118 of user device 116 may capture eye focus data 120 related to a user's eye and head movements. Data collector 210 may capture the eye and head movements of user 110 between the selection of image 302 and the loading of the webpage of FIG. 3C.

A delay between (a) when button 302 is selected, and (b) when the user's eyes focus on the visually significant portion of the webpage 306 (where the user is expected to focus) may be interpreted as a delay 122. ASTS 102 may take into account this delay in the automation scripting 270 described above. In an embodiment, the scripted interaction 104 may fail if no delay 122 is included, because the automation would outpace the actual loading of the second page 3C as recorded by the automation tool 260.

In an embodiment, a user may select an "Add to Wish List" button 308. The selection of button 308 may be captured as interaction data 108, and cause the screen illustrated in FIG. 3E to be loaded. The next page (FIG. 3E) may open with "1 item added to Wish List", which may represent the most likely area of focus (120) of the user 110. In an embodiment, the element tags may be collected by data collector 210 and provided to data storage unit 220 in addition to the selected attributes (related to the interaction 108) and timestamp 126.

Figure 3E:
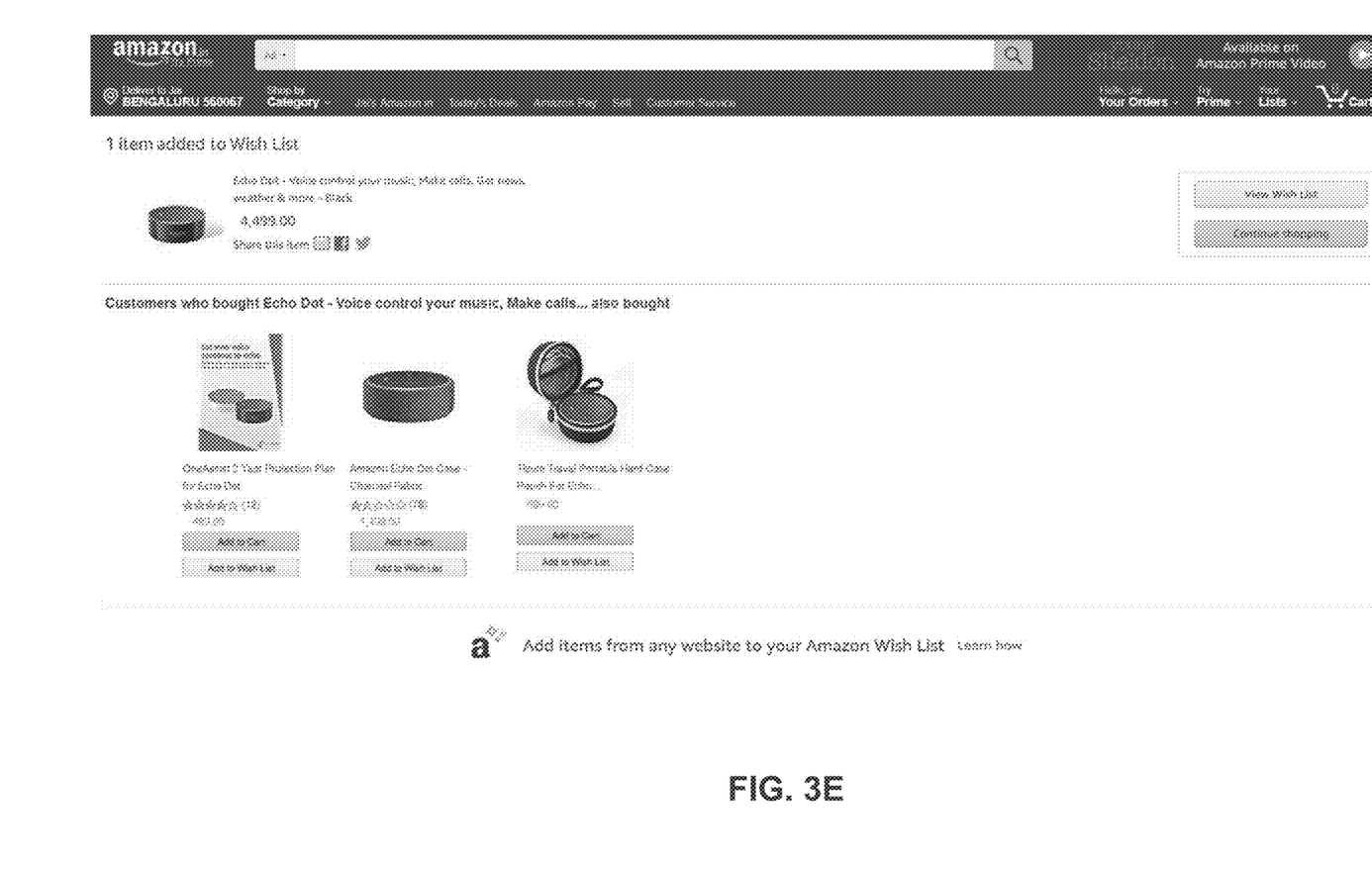

If the user 110 navigates to another site which is not being automated by ASTS 102, or the opened tab of the commerce site being monitored is idle over a prolonged period, then data collector 210 may insert an empty or end record to identify that the interaction 108 has completed.

Machine learning module 230 may be capable of determining whether the tan is an image, button or text (or some other object). Machine learning module 230 may identify the work flow based on the timestamp, and check whether the correct context or attributes are passed from the previous element (if any) by analyzing the sequence of other records until a different record is found in the database.

In the example of FIG. 3C, the machine learning module 230 may check until the "Add to Wish List" button 308 is clicked, which may represent the updated feature 114. A different action (other than selecting 308) may trigger a different interaction 108, or may not be recorded by data collector unit 210. If the user navigates to another website, data collector unit 210 may interpret the interaction 108 to be the end of the work flow and end the script.

However, before finalizing this as a final script, ASTS 102 may check for another similar stored workflow or interaction data 130 from the same user or from different users 110, If there are sufficient similarities beyond a threshold 132 between the stored and current interactions, then script finalization module 250 may disregard the current script (to avoid recording a duplicate script or interaction).

If the current script is sufficiently different from any stored interactions 130, scripted interaction 104 and the database data of the relevant elements involved in the script may then be sent to script recording module 250. In an embodiment, script recording module 250 may be integrated with one or more automation tools. The test case flow and element data may be transmitted from the script recording module 250 to the automation tools. The automation tools may generate the final script and enhance the test system with other automation scripts, in the corresponding format across different automation tools 260.

In an embodiment, the generated test scripts and/or automation scripts 270 may be executed or re-executed on a daily/hourly basis on the test system. In an embodiment, a tester 112 may have an option to modify the scripts in the test system (where the scripts are stored using the automation tools).

Figure 4:
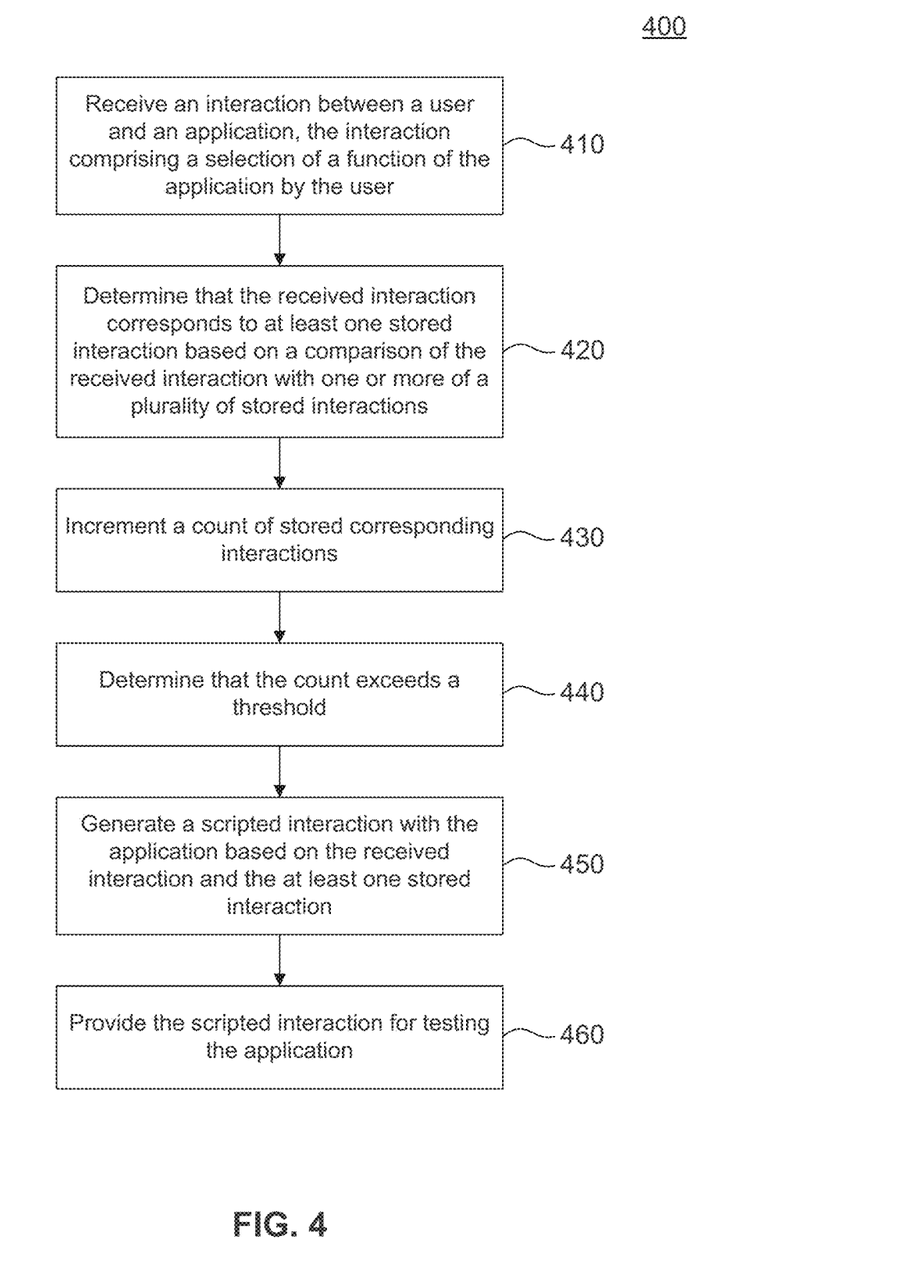
FIG. 4 is a flowchart illustrating example operations of an automated scripting and testing system, according to some embodiments.

FIG. 4 is a flowchart 400 illustrating example operations of an action-based image searching and identification system, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1 and 2. However, method 400 is not limited to those example embodiments.

In 410, an interaction between a user and an application is received. For example, a data collector 210 may receive an interaction 108 comprising the selection of a button 302 from an interface 107 of the application by a user 110.

In 420, it is determined whether the received interaction corresponds to at least one stored interaction based on a comparison of the received interaction with one or more of a plurality of stored interactions. For example, prior to a scripted interaction 104 being generated, ASTS 102 may store interaction data 130. When a count of similar interactions 108 exceed a threshold 132, such as once a given number of users select a particular button of interface 107, ASTS 102 may generate a scripted interaction.

In an embodiment, ASTS 102 may compare a series of received interactions 108 against a series of stored interaction 130. For example, received interaction 108 may include steps A, B, and D. ASTS 102 may determine whether any stored interactions 130 include the same or similar sequence of steps. For example, ASTS 102 may determine whether any of stored interactions 130 include all of steps A, B, and D. In other embodiments, subsets of steps may be identified, such as A and B, or B and D.

In 430, a count of stored corresponding interactions is incremented. For example, if the received interaction 108 corresponds to a stored interaction regarding a selection of activation of a similar feature 114, a count may incremented.

In 440, it is determined whether the count exceeds a threshold. For example, ASTS 102 may determine when a count of stored interactions 130 exceeds a threshold 132, such that there is sufficient data to generate scripted interaction 104. If the count does not exceed the threshold 132, then no update 134 or scripted interaction 104 may be generated.

In 450, a scripted interaction with the application is generated based on the received interaction and the stored interaction. For example, script finalization module 240 and script recording module 250 may generate a scripted interaction 104. Script recording module 250 and automation tool 260 may execute and update scripted interaction 104 to include an actual activation of the feature 114, or function from interface 107 of application 106. In an embodiment, prior to generating scripted interaction 104, ASTS 102 may confirm that there are no duplicate previously generated scripted interactions 104.

In 460, the scripted interaction for testing the application is provided. For example, ASTS 102 may execute or provide scripted interaction 104 for periodic execution to test a computing system or application 104.

Figure 5:
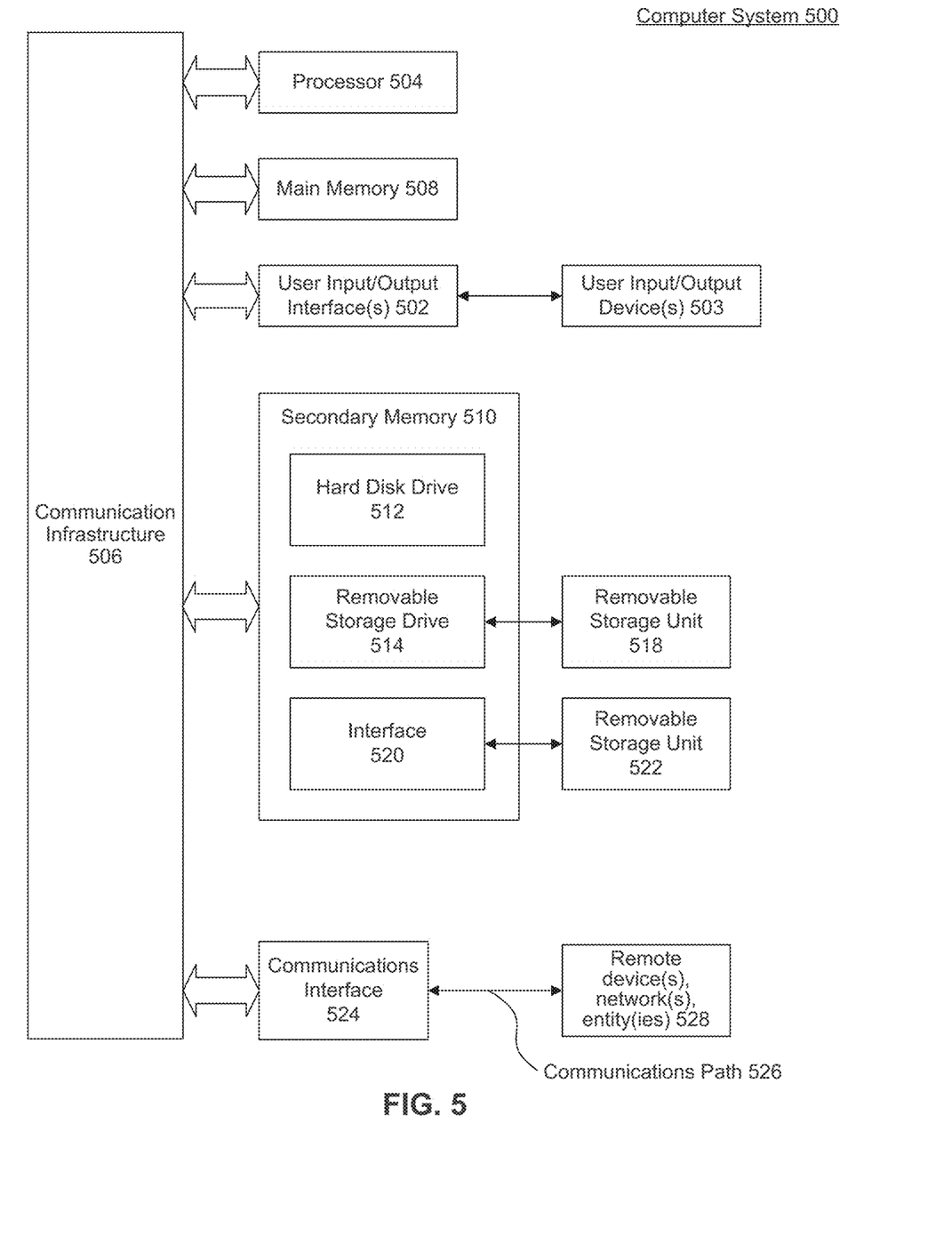
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, microphones, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device, Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving an interaction between a user and an application, the received interaction comprising a selection of a function of the application by the user, wherein the application includes a feature that was not included in a previous version of the application, and the selection corresponds to the feature;
   determining that the received interaction corresponds to at least one stored interaction based on a comparison of the received interaction with one or more of a plurality of stored interactions;
   incrementing a count of stored corresponding interactions;
   determining that the count exceeds a threshold;
   generating a scripted interaction with the application based on the received interaction and the at least one stored interaction; and
   providing the scripted interaction for testing the application.

2. The method of claim 1, wherein the generating comprises:
   updating an existing scripted interaction based on the received interaction.

3. The method of claim 1, further comprising:
   receiving updates to the provided scripted interaction submitted by a tester; and
   providing the scripted interaction including the updates.

4. The method of claim 1, wherein the receiving the interaction comprises:
   identifying a display element corresponding to the selection; and
   retrieving features of the display element.

5. The method of claim 4, wherein the retrieving the features comprises:
   retrieving the features of the display element upon the selection; and
   retrieving the features of the display element or one or more other display elements after the selection.

6. The method of claim 1, wherein the receiving the interaction comprises:
   receiving eye focus data indicating where the user's eyes were focused at the time of interaction.

7. The method of claim 6, further comprising:
receiving the eye focus data both upon and after the selection, wherein after the selection the user's eyes are focused outside of the application indicating a delay; and
adjusting the scripted interaction to account for the delay.

8. The method of claim 1, wherein the receiving the interaction comprises:
receiving coordinates associated with the selection on a first device with a first screen size; and
normalizing the coordinates based on a normalized screen size,
wherein the determining that the received interaction corresponds to at least one stored interaction comprises comparing the normalized received coordinates to coordinates of one or more of the plurality of stored interactions, wherein at least one of the plurality of stored interactions is associated with a second screen size different from the first screen size.

9. A system, comprising:
a memory; and
at least one processor coupled to the memory and configured to:
receive an interaction between a user and an application, the received interaction comprising a selection of a function of the application by the user, wherein the application includes a feature that was not included in a previous version of the application, and the selection corresponds to the feature;
determine that the received interaction corresponds to at least one stored interaction based on a comparison of the received interaction with one or more of a plurality of stored interactions;
increment a count of stored corresponding interactions;
determine that the count exceeds a threshold;
generate a scripted interaction with the application based on the received interaction and the at least one stored interaction; and
provide the scripted interaction for testing the application.

10. The system of claim 9, wherein the at least one processor that generates is configured to:
update an existing scripted interaction based on the received interaction.

11. The system of claim 9, wherein the at least processor is further configured to:
receive updates to the provided scripted interaction submitted by a tester; and
provide the scripted interaction including the updates.

12. The system of claim 9, wherein the at least one processor that receives is configured to:
identify a display element corresponding to the selection; and
retrieve features of the display element.

13. The system of claim 12, wherein the at least one processor that retrieves the features is configured to:
retrieve the features of the display element upon the selection; and
retrieve the features of the display element or one or more other display elements after the selection.

14. The system of claim 9, wherein the at least one processor that receives the interaction is configured to:
receive eye focus data indicating where the user's eyes were focused at the time of interaction.

15. The system of claim 14, wherein the at least one processor is further configured to:
receive the eye focus data both upon and after the selection, wherein after the selection the user's eyes are focused outside of the application indicating a delay; and
adjust the scripted interaction to account for the delay.

16. The system of claim 14, wherein the at least one processor that generates is configured to:
identify an automation tool configured to record a simulated user interaction based on the scripted interaction; and
generate the scripted interaction in a format associated with the automation tool.

17. A non-transitory computer-readable device having instructions stored thereon that, when executed by at least one computing device, cause the at least one computing device to perform operations comprising:
receiving an interaction between a user and an application, the received interaction comprising a selection of a function of the application by the user, wherein the application includes a feature that was not included in a previous version of the application, and the selection corresponds to the feature;
determining that the received interaction corresponds to at least one stored interaction based on a comparison of the received interaction with one or more of a plurality of stored interactions;
incrementing a count of stored corresponding interactions;
determining that the count exceeds a threshold;
generating a scripted interaction with the application based on the received interaction and the at least one stored interaction; and
providing the scripted interaction for testing the application.

* * * * *